United States Patent [19]
Jones

[11] Patent Number: 6,019,864
[45] Date of Patent: Feb. 1, 2000

[54] COMPOSITE WINDOW COVERING AND METHOD AND APPARATUS FOR MANUFACTURE THEREOF

[75] Inventor: Marvin L. Jones, Portland, Oreg.

[73] Assignee: Fashion Tech, Inc., Portland, Oreg.

[21] Appl. No.: 08/052,507

[22] Filed: Apr. 26, 1993

[51] Int. Cl.[7] .............................. B32B 31/18; E06B 3/48; E06B 9/06
[52] U.S. Cl. ...................... 156/258; 156/197; 156/263; 156/182; 160/84.05
[58] Field of Search .................... 156/182, 263, 156/266, 267, 258, 197, 227, 511, 523; 428/188, 178, 116; 160/84.1 D; 83/188, 195, 547

[56] References Cited

U.S. PATENT DOCUMENTS

| | | | |
|---|---|---|---|
| 1,489,716 | 4/1924 | Rupe | 83/188 |
| 3,250,164 | 5/1966 | Elsas | 83/547 |
| 4,019,554 | 4/1977 | Rasmussen | 428/116 X |
| 4,401,496 | 8/1983 | Koontz, Jr. | 156/266 X |
| 4,564,542 | 1/1986 | Worchester | 156/258 X |
| 4,675,060 | 6/1987 | Schnebly et al. | 428/116 X |
| 4,675,241 | 6/1987 | Hull | 156/267 X |
| 4,746,395 | 5/1988 | Lampe et al. | 156/267 X |
| 4,849,039 | 7/1989 | Colson et al. | 428/116 X |
| 4,974,656 | 12/1990 | Judkins | 428/116 X |
| 5,078,195 | 1/1992 | Schön | 160/84.1 D |
| 5,097,884 | 3/1992 | Sevcik et al. | 428/116 X |

*Primary Examiner*—Daniel Stemmer
*Attorney, Agent, or Firm*—Trask, Britt & Rossa

[57] ABSTRACT

A composite window shade is constructed of short lengths of cellular fabric that may be from the same dye lot or that may be of different colors or textures to achieve desired decorative or functional results by trimming the lengths to have attachment strip surfaces and bonding of the surfaces using a glue applicator machine through which each length of cellular fabric to be attached is passed to place beads of hot melt glue and then pressing the attachment strip surface of the length of fabric to be attached to the attachment strip surface of the length of fabric to which attachment is to be made and maintaining pressure thereon until bonding occurs.

8 Claims, 5 Drawing Sheets

COMPOSITE WINDOW COVERING AND METHOD AND APPARATUS FOR MANUFACTURE THEREOF

BACKGROUND OF THE INVENTION

1. Field

This invention relates to composite window coverings and to methods and apparatus for the manufacture of such coverings. The invention is particularly directed to the manufacture of full length pleated window coverings from physically similar remnant pieces of cellular (honeycombed) fabrics and the manufacture of full length window coverings having connected lengths of physically different window covering materials.

2. State of the Art

Expandable cellular fabric panels are commonly used as window coverings. Such window coverings permit light transmission and provide privacy, as desired. They are generally decorative, but also provide insulating barriers against heat transfer through window panes. In general, such fabric panels comprise a layer of a flexible sheet material, such as a polyester film, polyester impregnated paper or fabric. The sheet material is folded into individual tubular cells which are interconnected to form an elongate panel structure capable of bellows-like length adjustment. Each individual cell encloses an air pocket when the panel is stretched and suspended as a window covering. The air pockets serve as insulation. The interior and exterior surfaces of the panel structure may be made of materials having different properties, selected to meet specific use requirements. Cellular fabrics are sometimes referred to as "honeycomb" fabrics because the cells characteristically have hexagonal cross sections reminiscent of the individual cells of a honeycomb.

U.S. Pat. No. 4,019,554 discloses a thermal insulating curtain, especially for use in greenhouses. A plurality of superimposed tubular members are arranged unidirectionally to define a common slat-like partition between adjacent such members. Each of these tubular members, along its two opposite sides, has a folding crease to allow collapsing of the member, thereby to permit the entire curtain to either be collapsed in the manner of a blind or to be rolled up in the manner of a shade.

U.S. Pat. No. 4,288,485 discloses a collapsible and expandable tubular insulating curtain and a method of manufacture of such curtain. The curtain disclosed has rows of top to bottom interconnected tubes, with the tubes of adjacent rows bonded together.

U.S. Pat. Nos. 4,450,027, 4,603,072, and 4,631,108 each disclose a method and apparatus for fabricating cellular expandable insulation panels. The method and apparatus disclosed provide for folding a continuous thin film of flexible plastic material into a uniform, open faced tubular cell configuration and for heat setting the folds in permanent sharp creases. The method and apparatus further provide for the continuous stacking of successive lengths of the tubular film cells one on top of another on flat surfaces and adhering them together in the form of a neat, uniform, expandable panel of cellular configuration.

U.S. Pat. No. 4,795,515 discloses a method of making a series of expandable tubular polygons by simultaneously pleating and joining two adjacent sheets of fabric.

In practice, the construction and installation of window coverings from the cellular fabrics currently in use involves a significant amount of cutting. The resulting remnants are generally unsuitable for use and are discarded. As a consequence, a considerable portion of the investment made by fabricators for cellular fabric materials is wasted. There is a need for a method for salvaging this waste material.

There also remains a need for a method to produce window coverings of greater variety than now exists; notably coverings formed from connected lengths of cellular fabrics of different appearance or physical properties. Window covering sections having differing characteristics could then be selectively positioned fully or partially over selected portions of a window area.

SUMMARY OF THE INVENTION

In accordance with the present invention, a method and apparatus are provided that will allow for the utilization of remnant pieces cut from longer lengths of cellular fabric panels in the production of composite structures suitable for use as window coverings. The method and apparatus further permit the connection of shorter lengths of fabric panels having differing physical characteristics into a full length curtain panel. Certain preferred coverings are structured so that each of a plurality of fabric panel lengths of different characteristics are joined into a curtain panel longer than the window area to be covered. Panel regions (zones) of selected properties may then be arranged to fully or partially cover the window.

For purposes of this disclosure, the term "length," as applied to a fabric panel, refers to the dimension of the panel from top to bottom with the panel oriented as in a finished window covering; that is the length of a window covering or fabric panel is measured transverse the "length" of the individual cells which make up a panel. The "width" of a fabric panel corresponds to the conventional width dimension of a window curtain transverse the length dimension. The "thickness" or "depth" of the panel is measured transverse both the length and width dimensions.

The present invention involves the trimming of individual shorter lengths of cellular fabric panels so that they can then be bonded together to form full length, collapsible, cellular window coverings. The individual shorter lengths may be remnants from the trimming of originally full length panels which have been cut to window height. Alternatively, they may be lengths of fabric panels selected because of their specific characteristics to be included in a window covering having multiple zones of selected physical characteristics. For example, shorter lengths of fabric panels of different colors may be bonded together to coordinate with a room decor. In other instances, shorter lengths of fabrics of different light transparencies can be connected. A full length window covering may thereby be fabricated which is capable of permitting more or less light transmission, depending upon the positioning of the zones with respect to a window. Such a window covering can allow filtered light during daylight hours, through a properly positioned length (zone) of shear fabric. An adjacent length of opaque covering may be moved to replace the shear zone either during daylight hours or at night. The novel window coverings (curtains) producible by the apparatus and methods disclosed herein are an important feature of this invention.

In the production of the window coverings of the invention, addition lengths of fabric panel are bonded to receiving lengths to form a window covering assembly, or curtain. Terminal, or end, cells of the lengths are trimmed to provide attachment strip surfaces, glue is applied to the attachment strip surfaces of either or both an addition length and a receiving length. The attachment strip surface of each addition length is then pressed against the attachment strip surface of a receiving length until a secure bond is obtained. Each addition length may become a receiving length to which another addition length may be attached until a composite window covering assembly of desired hanging length has been formed.

According to the preferred embodiments, a cutter tool is used to trim the lengths of cellular fabric, and each addition length is compacted and moved by drive wheels of a glue applicator machine past a glue head through which hot melt glue is applied to the attachment strip surface of the addition length. The glue applicator machine has adjustment guides that allow for accommodation of addition lengths having varying thicknesses, when compacted, and varying widths. Sensors on the glue applicator machine detect the presence of an addition length as such length is inserted into and is moved through the machine. The sensors also control application of glue through the glue head to an attachment surface of the addition length.

Each addition length, with hot melt glue applied to its attachment strip, is discharged from the glue applicator machine onto an assembly table surface, and then is pushed into bonding engagement with a receiving length of cellular fabric that has been previously trimmed and prepositioned on that table surface. Pressure is maintained until the attachment strip surfaces of the lengths of material are bonded together. An addition length may subsequently function as a receiving length for the bonding attachment of another addition length.

BRIEF DESCRIPTION OF THE DRAWINGS

In the drawings, which illustrate what is presently regarded as the best mode for carrying out the invention.

DETAILED DESCRIPTION OF THE ILLUSTRATED EMBODIMENT

Figure 1:
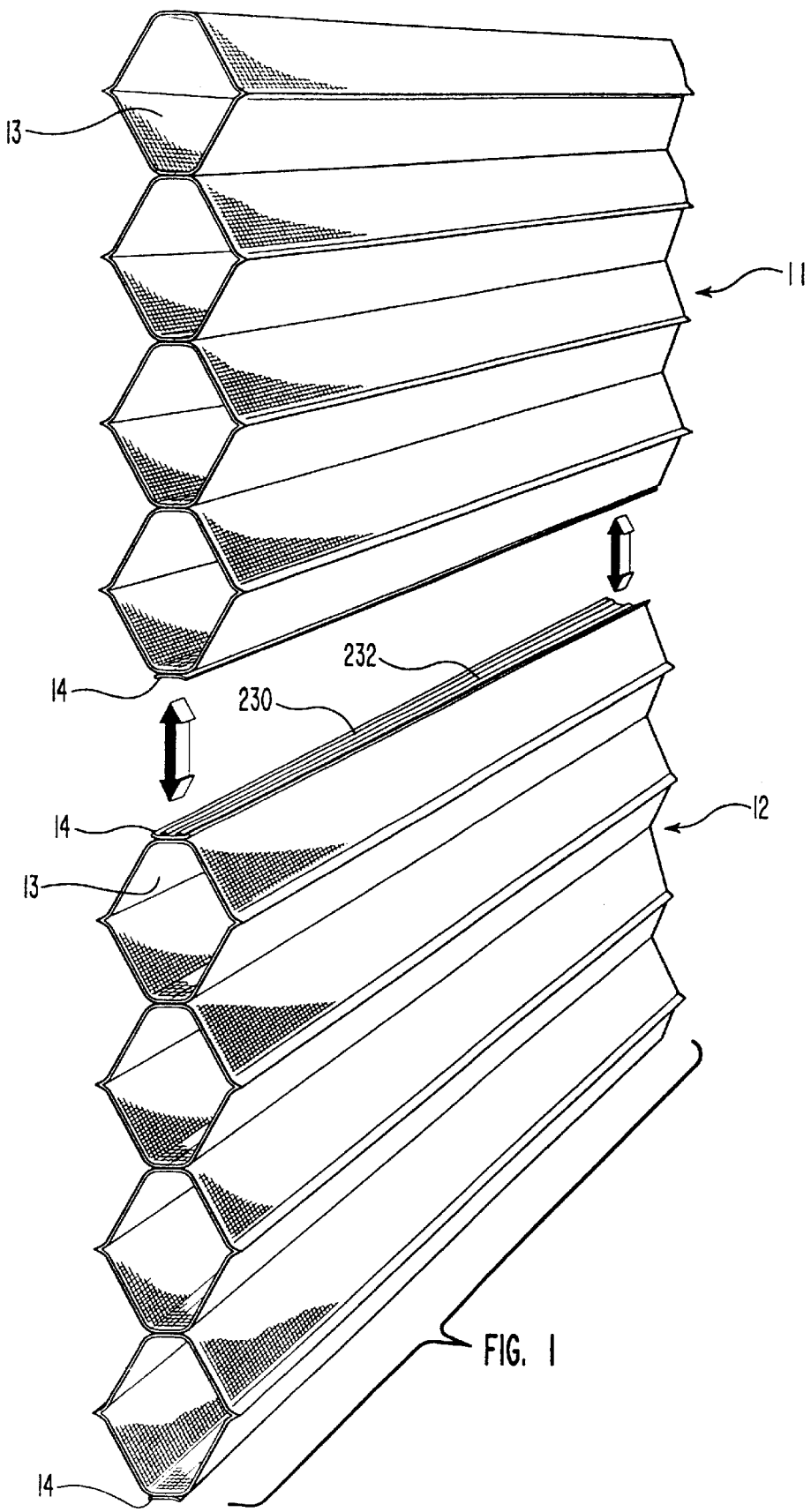
FIG. 1 is a perspective view of trimmed lengths of cellular fabric panels prepared and aligned for bonding together.
Figure 2:
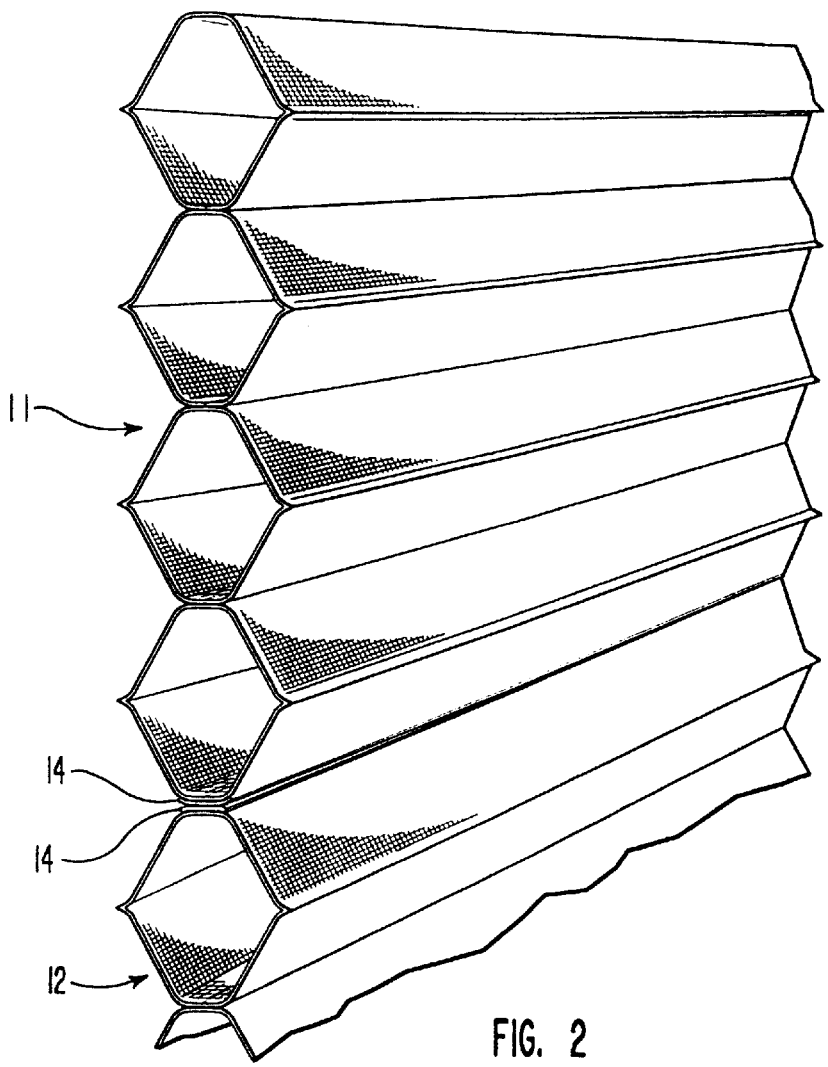
FIG. 2 is a fragmentary view like that of FIG. 1, but showing the lengths of fabric panel bonded together.

As illustrated by FIGS. 1 and 2 of the drawings, short lengths 11, 12 of cellular fabric panels are interconnected to make a composite full length window covering. The short lengths 11, 12 may be remnant pieces from the same dye lot of fabric. In that event, when connected (together with any other lengths as required from the same dye lot) they will form a window covering of uniform color, or of uniform interior and exterior colors and texture. Alternatively, the short lengths may be of fabrics having different interior or exterior colors or textures. If short lengths of fabrics of different colors or fabric textures are interconnected, the resulting full length window covering may have accent stripes or it may serve as a decorator accent to an interior room design.

If necessary, the short lengths to be interconnected are trimmed to a uniform width W consistent with the width of a window area to be covered. Thereafter, a cell 13 of each short length to be connected is trimmed to provide a neat attachment surface strip 14. Glue beads are run along each edge of each attachment surface strip 14 of the short length 12 of cellular fabric to be attached, and the glue covered attachment surface is pressed against a clean (non-glued) attachment surface strip 14 of a short receiving length 11 to which attachment is to be made. Pressure is released after initial bonding has occurred. The resulting bond is essentially non-detectable, i.e. is not readily visible during normal installation and use and does not adversely affect the manner of use of the composite window covering formed.

Figure 3:
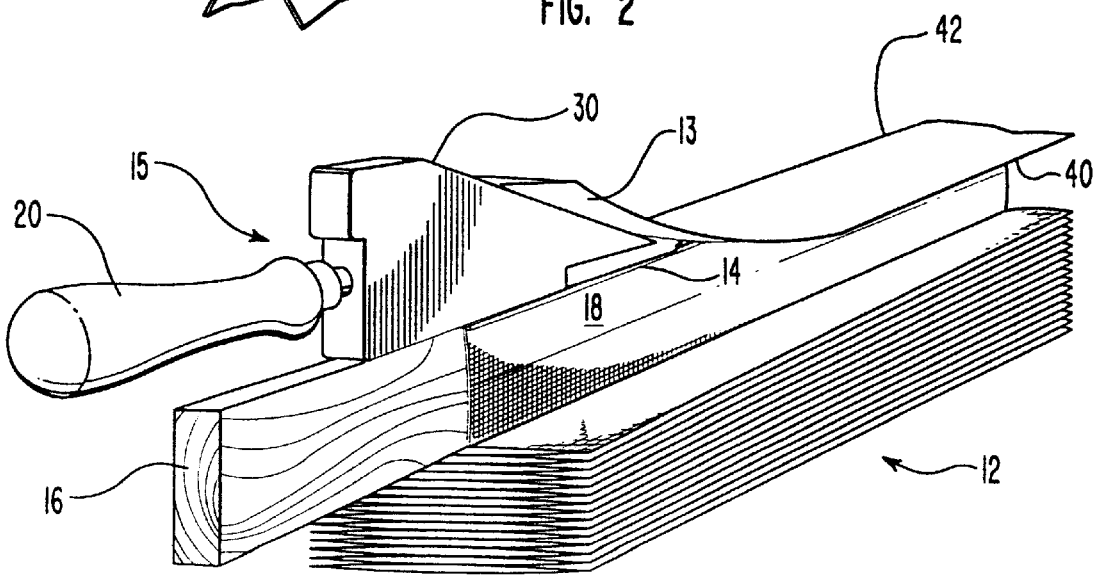
FIG. 3 is a perspective view of a cutter and a backing member shown as used to trim lengths of cellular fabric panel.

As shown in FIG. 3, a special cutting tool 15 is desirably used to trim a cell 13 of a short length 12 of cellular fabric to be attached. In trimming cell 13, a backing member 16, which comprises a slat, made of wood, plastic or the like, is first inserted fully into a cell 18 adjacent to the cell 13 to be trimmed. The backing member 16 opens the cell 18 and holds the cell in an upright, open, taut condition during the cutting process.

Figure 4:
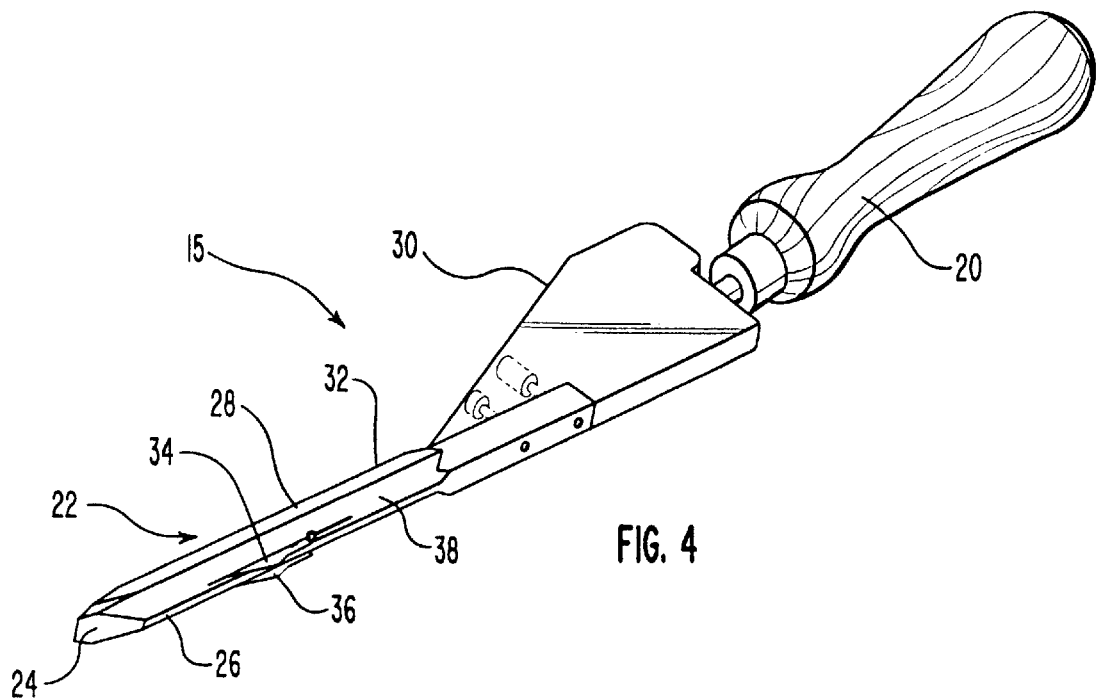
FIG. 4 is a perspective view of the cutter of FIG. 3.
Figure 5:
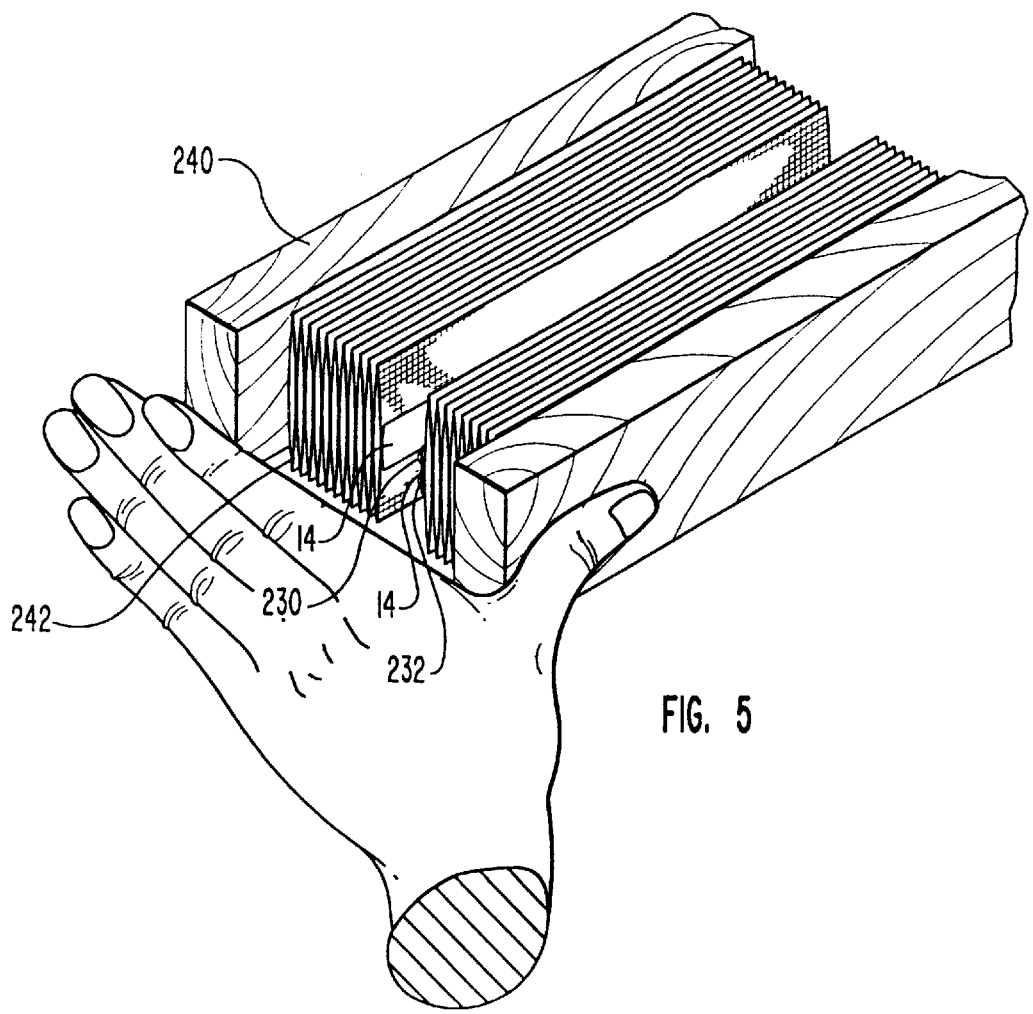
FIG. 5 is a pictorial view illustrating a bonding procedure.

As best shown by FIG. 4, the cutting tool 15 has a handle 20 from which a guide member 22 extends. The guide member has a bevelled top and bottom nose 24 and a pair of bevelled top and bottom side edges 26 and 28. A material guide surface 30 extends from an upper surface 32 of the guide member 22, upwardly and rearwardly to connection with the handle 20. A pair of spaced apart, parallel cutting blades 34 and 36 project from a bottom 38 of the guide member 22. The blades 34 and 36 are spaced apart as necessary to provide cuts leaving a desired strip of fabric, dependent upon the size the cell being trimmed. The thickness of the remnant strip varies for cells of different sizes. Accordingly, the dimensions of the cutting tool 15, including its desired blade spacing, will be determined in each instance by the size of the cells in the cellular fabric to be trimmed.

In practice, after the backing member 16 has been fully inserted into cell 18, the cutting tool nose 24 is inserted into cell 13. It is then slid along the backing member 16 while the fabric of the cell 18 is stretched into an upright condition, as shown in FIG. 3. The cutting tool 15 is pushed the full length of the cell 13 (the full width of the panel 12). The edges 26 and 28 move inside the cell, along inner and outer intermediate creases 40 and 42 of cell 13 and hold the cell in an expanded state. The parallel blades 34 and 36 cut the fabric of cell 13 along lines that are just outside the original glue lines connecting the cell 13 to the cell 18, thus forming the attachment strip surface 14. The fabric from cell 13 and any other cell(s) attached to cell 13 and cut away during the trimming operation is guided up and away from the hand of the user of the tool by the material guide 30.

Figure 6:
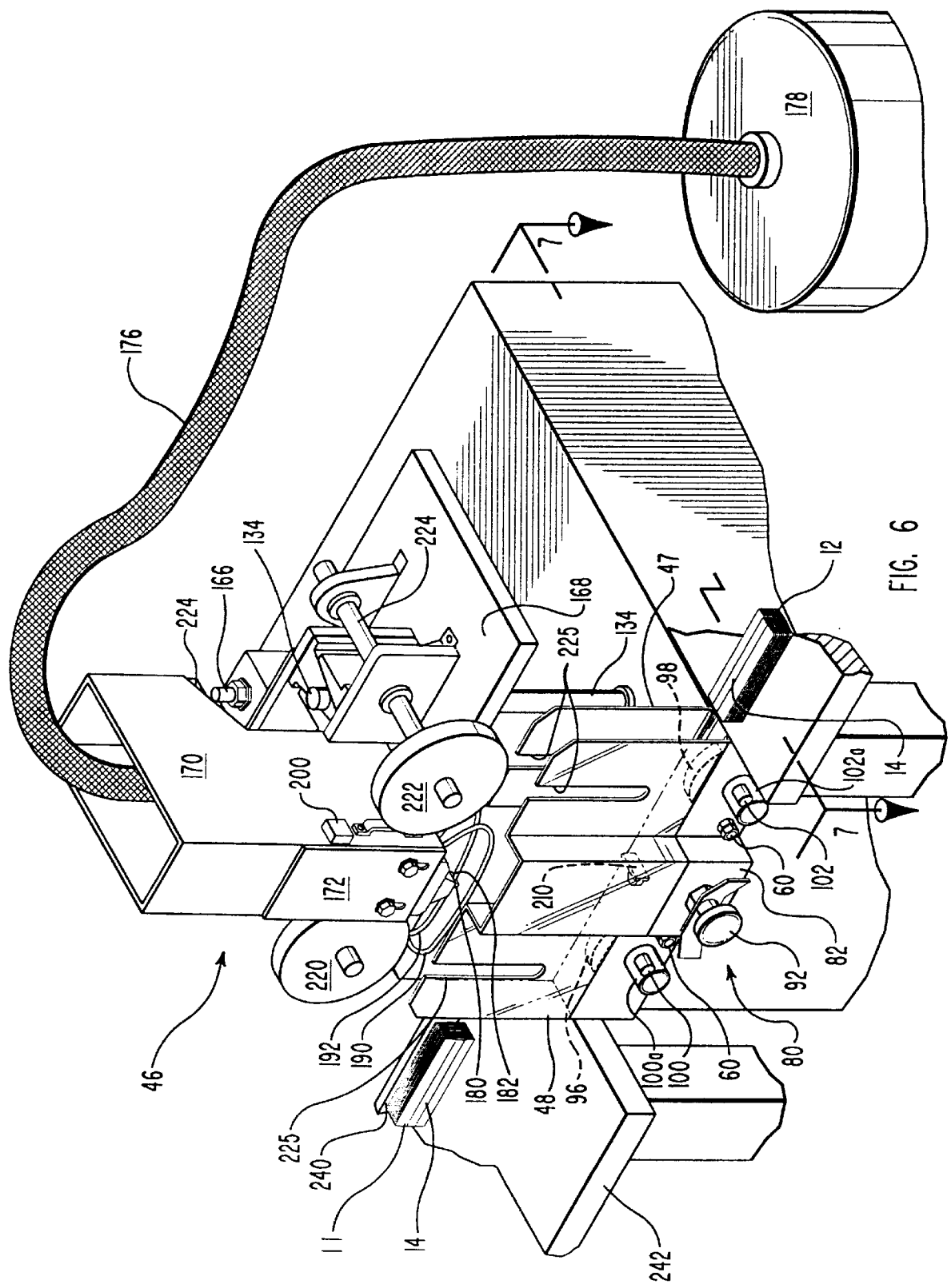
FIG. 6 is a perspective view of a glue applicator machine of the invention used in practicing the method.
Figure 7:
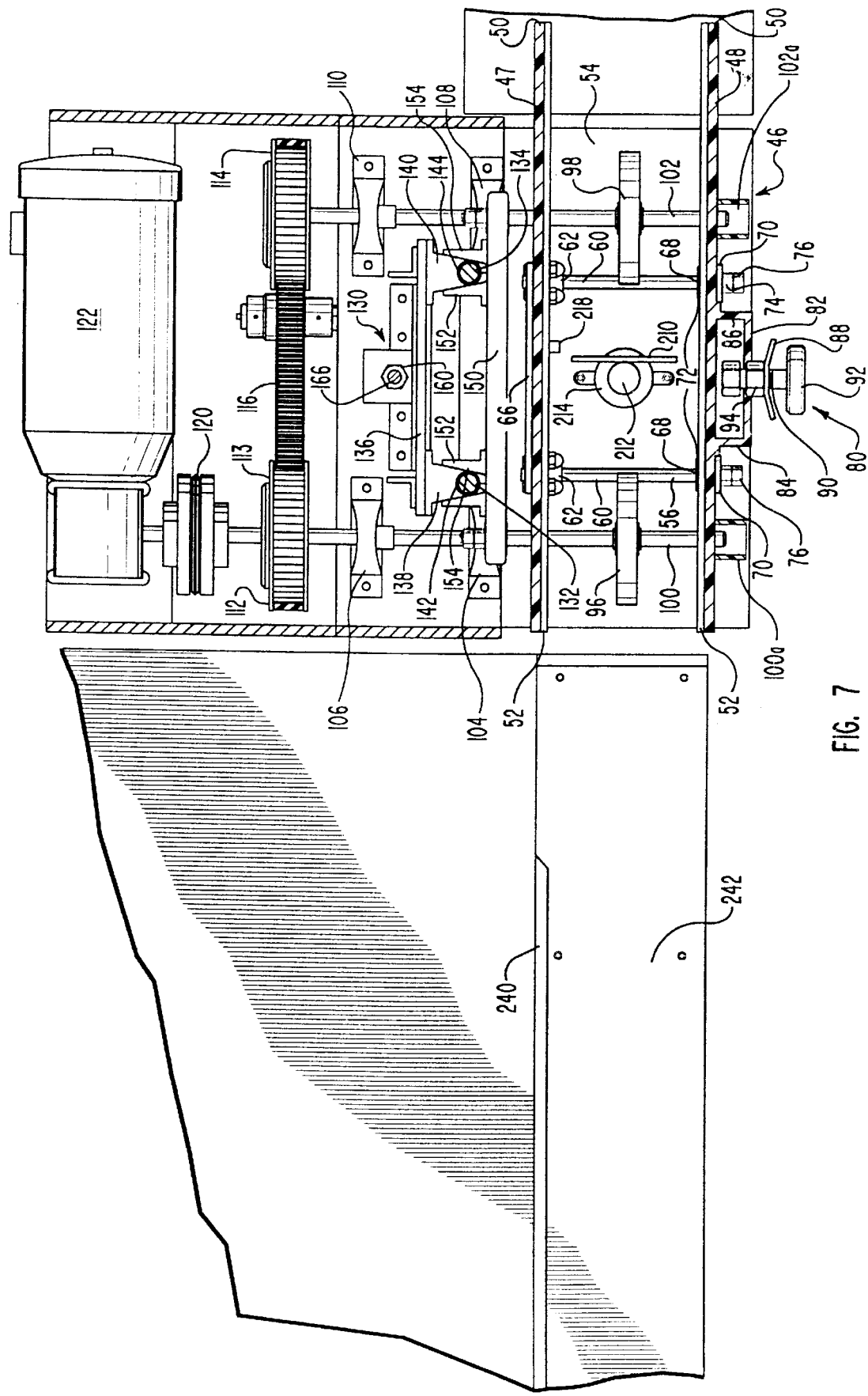
FIG. 7 is a horizontal section view of the machine of FIG. 6, taken on the line 7–7 of FIG. 6.

After the short length 12 of fabric has been trimmed to leave attachment strip surface 14, the length 12 is compacted. Each length 12 to be attached is passed through a glue applicator machine 46 (FIGS. 6 and 7) which functions to apply glue to the cell material along the attachment strip surface 14.

The glue applicator machine 46 includes a pair of spaced apart guide rails 47 and 48, each having a feed end 50 and a discharge end 52. Guide rail 47 is fixed to and is supported on a support frame including a platform, shown generally at 54. Guide rail 48 is supported by a pair of spaced apart rods 56 and 58. The rods 56 and 58 each have an end 60 extending tightly into a bushing 62 carried by a plate 66 fixed to and depending from guide rail 47. The opposite end 68 of each of the rods 56 and 58 is inserted through a plate 70 depending from rail 48, and is threaded through another plate 72 depending from the rail 48. The end 68 of each rod 56 and 58 has a lock nut 74 threaded thereon and a nut 76 fixed to the end to serve as a turning head for the rod. When lock nut 74 is loosened and nut 76 is turned, the attached rod 56 or 58 is moved into or out of bushing 62. This movement allows the rail 48 to be angularly adjusted with respect to rail 47 so that the rails are maintained parallel even though the spacing between the rails may be adjusted.

The rods 56 and 58 are moved simultaneously in their bushings 62 by a center adjustment assembly, shown generally at 80. Center adjustment assembly 80 includes a bracket 82 having angled ends 84 and 86 fixed to the rail 48. A support post 88 is fixed to the support frame 54 and a bolt 90, having a knob 92 on one end, is passed through the support post to be threaded into a nut 94 that is fixed at one side of a hole through the bracket 82. Turning of the knob 92 and the bolt 90 affixed thereto moves the nut 94 along the bolt 90 and thereby moves the bracket 82 attached to the nut and rail 48 attached to the bracket towards or away from rail 47 to thereby adjust the spacing between the rails. With the center adjustment assembly 80 it is a simple matter to quickly space the rails 47 and 48 to accommodate lengths of cellular fabric having different thicknesses.

A pair of spaced apart drive wheels 96 and 98 have their periphery drive surfaces between the guide rails and arranged to engage cellular fabric placed on the guide rails 47 and 48 and to move the fabric from the feed ends to the discharge ends of the rails.

Drive wheels 96 and 98 are respectively mounted on drive shafts 100 an 102. Drive shaft 100 is journaled through and supported by spaced apart bearings 104 and 106 that are mounted on support frame 54. Similarly, drive shaft 102 is journaled through and supported by spaced apart bearings 108 and 110 that are also mounted on the support frame 54.

A pulley 113 is fixed to shaft 100 and a pulley 114 is fixed to shaft 102. The pulleys are interconnected by a drive belt 116. Drive shaft 100 is connected to the output of a clutch 120 and the input of the clutch is connected to the output of an electric drive motor 122. During operation, the motor 122, through clutch 120, drives shaft 100 and, simultaneously through the pulley 113, belt 116, and pulley 114, the shaft 102. Thus, the drive wheels 96 and 98 that are respectively fixed to the shafts 100 and 102 are simultaneously driven by operation of motor 122.

A lift unit 130 is mounted on the support frame 54. The lift unit includes a pair of spaced apart upright posts 132 and 134. A cross head 136 has a pair of spaced apart arms 138 and 140 projecting therefrom and the arms 138 and 140, respectively, have ports 142 and 144 therein to respectively fit over and be guided by the posts 132 and 134.

A cross brace 150 extends between the bearings 104 and 108, and a pair of angled guide members 152 and 154 for each of the arms 138 and 140 are fixed to the cross brace 150.

A fluid cylinder 160 has its one end of its cylinder housing fixed to the support frame 54 and the end of the cylinder rod 166 extending from the cylinder housing fixed to a top plate 168. The cross head 136 is fixed to and moves with the top plate 168 in response to expulsion or retraction of the cylinder rod 166.

A bracket 170 is carried by top plate 168 and supports a glue head 172. Bracket 170 is fixed to a hose housing 174 mounted on top plate 168. The glue head 172 is cantilevered above the path of travel of cellular fabric 14. Glue is supplied to the glue head through a heated hose 176 extending into the hose housing 174 from a conventional pressurized hot melt glue machine 178. The glue head includes a pair of spaced apart nozzles 180 and 182 extending downwardly to distribute beads of glue onto the cellular fabric as it passes beneath the glue head 172.

A pair of spaced apart skids 190 and 192 are carried by the glue head 172, outwardly of the nozzles 180 and 182, to hold the fabric 14 taut as it passes beneath the skids and as beads of glue are applied to the fabric through the nozzles.

A sensor 200, which may be an optical sensor, is carried by the bracket 170, and is positioned to sense whether fabric 12 is positioned beneath the glue head. The sensor 200 then controls valved flow through the nozzles 180 and 182, permitting flow through the nozzles as the fabric is passed beneath and prohibiting flow through the nozzles when there is no fabric 12 positioned beneath the glue head.

A stop plate 210 is supported by a solenoid rod 212 of a solenoid 214 mounted to the support frame 54. The stop plate 210 is positioned to be engaged by fabric 12 manually inserted over the drive wheels 96 and 98 and into a location beneath the sensor 200. Engagement of the fabric 12 with stop plate 210 positions the fabric to actuate a sensor switch 218 which causes actuation of solenoid 214 to retract the solenoid rod 212 and stop plate 210 out of the path of travel of the fabric 12. At the same time sensor 200 is actuated to sense whether the fabric 12 is beneath the glue head. Also, actuation of the solenoid 214 is accompanied by actuation of motor 122 to drive the wheels 96 and 98, as previously described, that carry the fabric 12 through the glue applicator machine 46.

A pair of overhead roller wheels 220 and 222 are each journaled to a shaft 224 carried by the top plate 168 and movable with the cross-head 136. The wheels 220 and 222 are respectively positioned above the drive wheels 96 and 98 and turn with the drive wheels in response to frictional engagement of the roller wheels with the fabric 12 passing between the drive wheels and the roller wheels. The roller wheels and their journaled shafts 224 move up and down with plate 168. Shafts 124 are guided in slots 225 of front and rear protective shields as the wheels are raised and lowered. The pressure applied by the roller wheels on fabric 14 insures movement of the fabric in response to turning of the drive wheels beneath the fabric.

In operation of the apparatus of the invention the first length 11 of cellular fabric to which a second length 12 of cellular fabric is to be attached is cut to a desired width. The length 11 is trimmed, as previously described, using a guide member 22. The spaced apart cutting blades 34 and 36 then leave central attachment strip surfaces 14, as previously described, at opposite ends of the lengths 11. The first length 11 is placed against a back wall 240 of a gluing table 242, with a first cell 13 at one end of the length 11, against the wall.

The second length 12 of cellular fabric is cut to desired width and is trimmed in the same manner to have central attachment strip surfaces 14 at its opposite ends. If still another length of cellular fabric is to be attached, other central attachment strip surfaces are formed, in the manner described, at the opposite ends of each other length of cellular fabric 12 to be added. In addition, still other lengths of cellular fabric may be similarly cut to width and be trimmed to have one or more central attachment strip surfaces and can also be attached to make a composite window covering.

Each length of fabric, other than the first length 11, to be used in making the composite window covering, is passed through the glue applicator machine with a central glue strip facing upwardly to receive glue, on one attachment strip surface 14.

In passing each length of fabric 12 through the machine 46 after the length has been cut to desired width, one end of the length is placed on the guide rails 50 and 52, which are set to be parallel and that are spaced apart to accommodate the thickness of the compacted length of fabric 12 being passed through the machine. A leading edge of the length 12 is moved along the rails 50 and 52 until it engages the stop plate 210. Engagement with stop plate 210 triggers operation of the machine 46 to move the roller wheels 220 and 222 into engagement with fabric 12 and the glue head 172 down to a dispensing position. The motor 132 is operated to actuate drive wheels 96 and 98 to move the length 12 beneath and past the gluing head 172. At the same time the sensor 200 is actuated to detect any fabric beneath the glue head. If the sensor detects the presence of a length of fabric 12, the glue head is actuated to dispense spaced apart beads of glue 230 and 232 from the nozzle pair 180 and 182. The nozzles continue to dispense only so long as the sensor detects the presence of the length of fabric 12 and glue flow is stopped as soon as the length 12 is moved past the glue head, at which time the glue head 172 and roller wheels 220 and 222 are raised. The glue applicator machine 46 is then ready to have another length of fabric 12 passed therethrough.

The length of fabric 12 that has been passed through the glue applicator machine 46 is moved by drive wheels 96 and 98 onto the gluing table 242 where it is turned and moved to place the central gluing strip 14, to which the beads of glue 230 and 232 have been applied, against the non-glue covered attachment surface 14 of the first length 11 of cellular fabric, or a subsequent length of fabric 12 previously attached to such first length of fabric. The connected lengths of cellular fabric 11 and 12 (including as many lengths 12 as desired) then comprise a composite window covering made from individual lengths in such a manner that the glue joints between lengths are detectible only under the closest scrutiny.

Reference herein to certain details of the illustrated embodiments is not intended to limit the scope of the appended claims which themselves recite those features regarded as important to the invention.

What is claimed:

1. A method of making a composite window covering from panels of cellular fabric, said fabric being constructed of tubular cells arranged in side by side relationship, comprising the steps of:

providing a first panel of cellular fabric of desired width;

trimming a cell of said first panel of cellular fabric to leave a first attachment strip surface extending centrally of the thickness of said first panel of material and the full length of said cell;

providing a second panel of cellular fabric of said desired width;

trimming a cell of said second panel of cellular fabric to leave a second attachment strip surface extending centrally of the thickness of said second panel the full length of said cell;

placing an adhesive along the length of said second attachment strip surface; and pressing said second attachment strip surface to said first attachment strip surface in aligned relationship until bonding occurs between said first and second panels of cellular fabric.

2. A method according to claim 1, wherein:

said first cell of said first panel of cellular fabric and said second cell of said second panel of cellular fabric are each trimmed by inserting a backing member slat into a cell adjacent each said first and second cell, inserting a cutting tool into said first and second cell and causing said tool to travel on said slat to cut said cell fabric away from said attachment strip surface.

3. A method according to claim 2, wherein:

said adhesive is placed along the length of said second attachment strip surface by a glue applicator machine as said second length of cellular fabric is passed through said glue applicator machine.

4. A method according to claim 3, wherein:

said first panel of cellular fabric is placed on a gluing table with the attachment strip surface facing away from a wall of said table;

the attachment strip surface of said second panel of cellular fabric is placed against said attachment strip surface of said first panel of cellular fabric and is pressed thereagainst until bonding occurs.

5. A method according to claim 2, further including:

selecting first and second panels of cellular fabric from the same dye lot of fabric.

6. A method according to claim 2, further including:

selecting first and second panels of cellular fabric of different respective colors.

7. A method according to claim 2, further including:

selecting first and second panels of cellular fabric of different respective fabric textures.

8. A method according to claim 2, further including:

selecting one of said first and second panels of cellular fabric to be transparent and the other of said panels to be opaque.

* * * * *